United States Patent
Li et al.

(10) Patent No.: US 9,251,409 B2
(45) Date of Patent: Feb. 2, 2016

(54) METHODS AND APPARATUSES FOR GESTURE RECOGNITION

(75) Inventors: Jiangwei Li, Beijing (CN); Kongqiao Wang, Beijing (CN); Lei Xu, Beijing (CN); Yikai Fang, Beijing (CN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/351,000

(22) PCT Filed: Oct. 18, 2011

(86) PCT No.: PCT/CN2011/080962
§ 371 (c)(1),
(2), (4) Date: Apr. 10, 2014

(87) PCT Pub. No.: WO2013/056431
PCT Pub. Date: Apr. 25, 2013

(65) Prior Publication Data
US 2014/0286535 A1    Sep. 25, 2014

(51) Int. Cl.
*G06K 9/00* (2006.01)
*G06K 9/38* (2006.01)
(Continued)

(52) U.S. Cl.
CPC .............. *G06K 9/00355* (2013.01); *G06K 9/38* (2013.01); *G06K 9/72* (2013.01); *G06T 7/0042* (2013.01); *G06T 7/2033* (2013.01); *G06T 2207/10016* (2013.01); *G06T 2207/20081* (2013.01); *G06T 2207/20144* (2013.01); *G06T 2207/20148* (2013.01)

(58) Field of Classification Search
CPC .......... G06K 9/00335; G06K 9/00389; G06K 9/00221; G06F 3/00
See application file for complete search history.

(56) References Cited

U.S. PATENT DOCUMENTS 7,668,356 B2 * 2/2010 Chen ..................... G06T 7/0012
                                                        128/922
8,965,051 B2    2/2015 Fang et al.
(Continued)

FOREIGN PATENT DOCUMENTS

CN    101324922    12/2008
CN    101344816    1/2009
(Continued)

OTHER PUBLICATIONS

Qi et al. ("Medical Image Edge Detection Based on Omni-directional Multi-Scale Structure Element of Mathematical Morphology", 2007).*
(Continued)

*Primary Examiner* — Avinash Yentrapati
(74) *Attorney, Agent, or Firm* — Alston & Bird LLP

(57) ABSTRACT

Methods, apparatuses, and computer program products are herein provided for enabling hand gesture recognition using an example infrared (IR) enabled mobile terminal. One example method may include determining a hand region in at least one captured frame using an adaptive omnidirectional edge operator (AOEO). The method may further include determining a threshold for hand region extraction using a recursive binarization scheme. The method may also include determining a hand location using the determined threshold for the extracted hand region in the at least one captured frame. The method may also include determining a fingertip location based on the determined hand location. Similar and related example apparatuses and example computer program products are also provided.

20 Claims, 8 Drawing Sheets

(51) Int. Cl.
G06K 9/72 (2006.01)
G06T 7/00 (2006.01)
G06T 7/20 (2006.01)

(56) References Cited

U.S. PATENT DOCUMENTS

| | | | | |
|---|---|---|---|---|
| 8,970,696 | B2* | 3/2015 | Xiong | G06F 3/017 345/156 |
| 2002/0178344 | A1* | 11/2002 | Bourguet | G06K 9/00335 712/1 |
| 2007/0031015 | A1* | 2/2007 | Chen | G06T 7/0012 382/128 |
| 2009/0103780 | A1* | 4/2009 | Nishihara | G06F 3/017 382/103 |
| 2009/0254869 | A1 | 10/2009 | Ludwig et al. | |
| 2010/0104134 | A1 | 4/2010 | Wang et al. | |
| 2010/0315337 | A1 | 12/2010 | Ferren et al. | |
| 2011/0054360 | A1 | 3/2011 | Son et al. | |
| 2011/0093820 | A1* | 4/2011 | Zhang | A63F 13/06 715/863 |
| 2011/0301934 | A1* | 12/2011 | Tardif | G06F 3/017 704/1 |
| 2012/0309532 | A1* | 12/2012 | Ambrus | A63F 13/06 463/36 |
| 2013/0285908 | A1* | 10/2013 | Kaplan | G06F 3/011 345/158 |
| 2014/0105455 | A1* | 4/2014 | Murase | G06F 3/0426 382/103 |

FOREIGN PATENT DOCUMENTS

| | | |
|---|---|---|
| CN | 101470800 | 7/2009 |
| CN | 101719015 | 6/2010 |
| CN | 101853071 | 10/2010 |
| WO | 2009/118183 A2 | 10/2009 |
| WO | 2012/051747 A1 | 4/2012 |
| WO | 2012/119308 A1 | 9/2012 |

OTHER PUBLICATIONS

Arora et al. ("Multilevel thresholding for image segmentation through a fast statistical recursive algorithm", 2007).*
International Search Report and Written Opinion received for corresponding Patent Cooperation Treaty Application No. PCT/CN2011/080962, dated Jul. 26, 2012, 5 pages.
Zhou, Hang et al., A Real-Time Gesture Recognition Algorithm on Video Surveillance, Signal Processing, 2006, 8th International Conference, vol. 3.
"GestureTek Labs: Patent And Technology Licensing Program", GestureTek, Retrieved on Jul. 3, 2015, Webpage available at : http://www.gesturetek.com/products/technologyandlicensing.php.
"Eyesight", Eyesight-Tech, Retrieved on Jul. 3, 2015, Webpage available at : http://eyesight-tech.com/.
Shin et al., "Hand Region Extraction And Gesture Recognition Using Entropy Analysis", International Journal of Computer Science and Network Security, vol. 6, No. 2A, Feb. 2006, pp. 216-222.
Kasprzak et al., "Hand Image Interpretation Based On Double Active Contour Tracking", Romansy 16, Robot Design, Dynamics, And Control.CISM Courses and Lectures, vol. 487, 2006, pp. 439-446.
Tan et al., "Hand Extraction Using Geometric Moments Based On Active Skin Color Model", IEEE International Conference on Intelligent Computing and Intelligent Systems, vol. 4, Nov. 20-22, 2009, pp. 468-471.
Malik, "Real-Time Hand Tracking And Finger Tracking For Interaction", CSC2503F Project Report, Dec. 18, 2003, 21 pages.
Kolsch et al., "Fast 2d Hand Tracking With Flocks Of Features And Multi-Cue Integration", Proceedings of the 2004 Conference on Computer Vision and Pattern Recognition Workshop, vol. 10, Jun. 2004, pp. 1-8.
Park et al., "Efficient Fingertip Tracking And Mouse Pointer Control For A Human Mouse", Proceedings of the 3rd international conference on Computer vision systems, vol. 2626, 2003, pp. 88-97.

Oka et al., "Real-Time Fingertip Tracking And Gesture Recognition", IEEE Computer Graphics and Applications, vol. 22, No. 6, Nov./Dec. 2002, pp. 64-71.
Hu, "Visual Pattern Recognition By Moment Invariants", IRE Transactions on Information Theory, vol. 8, No. 2, Feb. 1962, pp. 179-187.
Knight et al., "A Framework For Recognizing Hand Gestures", CS229 Final Project Paper, 2010, pp. 1-5.
Hassanpour et al., "Human Computer Interaction Using Vision-Based Hand Gesture Recognition", Journal of Computer Engineering, vol. 1, 2009, pp. 21-30.
Extended European Search Report received for corresponding European Patent Application No. 11874182.6, dated Jun. 26, 2015, 8 pages.
Wong et al., "Hand Geometry Image Enhancement And Feature Extraction", International Conference on Image Processing, 2002, 4 Pages.
Al-Amri et al., "Image Segmentation By Using Thershod Techniques", Journal Of Computing, vol. 2, No. 5, May 2010, pp. 83-86.
Morrison et al., "An Experimental Comparison Of Trajectory-Based And History-Based Representation For Gesture Recognition", Gesture-Based Communication in Human-Computer Interaction Lecture Notes in Computer Science , vol. 2915, 2004, pp. 152-163.
Dawod et al., "Fingertips Detection From Color Image With Complex Background", The 3rd International Conference on Machine Vision, 2010, pp. 88-91.
European Search Report for Application No. EP 11 874 182.6 dated Jun. 29, 2015.
Gesturetek || Technology Patent Licensing [online] [retrieved Jul. 9, 2015]. Retrieved from the Internet: http://www.gesturetek.com/products/technologyandlicensing.php>. (undated) 2 pages.
eyeSight | eyesight | We Make Awesome User Experiences [online] [retrieved Jul. 9, 2015]. Retrieved from the Internet: http://www.eyesight-tech.com>. (undated) 3 pages.
Al-Amri, S. S. et al., *Image Segmention by Using Thershod Techniques*, Journal of Computing, vol. 2, No. 5 (May 1, 2010) 83-86.
Dawod, A. H. et al., *Fingertips Detection From Color Image With Complex Background*, The 3rd International Conference on Machine Vision (ICMV 2010) (Dec. 28, 2010) 88-91.
Hu, M. K., *Visual Pattern Recognition by Moment Invariants*, IEEE Transaction on Information Theory, vol. 8 (1962) 179-187.
Kasprzak, W. et al., *Hand Image Interpretation Based on Double Active Contour Tracking*, Robot Design, Dynamics, and Control, CISM Course and Lectures, No. 487 (2006) 439-446.
Kolsch, M. et al., *Fast 2D Hand Tracking With Flocks of Features and Multi-Cue Integration*, IEEE Conference on Computer vision and Pattern Recognition Workshop (2004).
Malik, S., *Real-Time Hand Tracking and Finger Tracking for Interaction*, CSC2503F Project Report (Dec. 18, 2003) 21 pages.
Morrison, K. et al., *An Experimental Comparison of Trajectory-Based and History-Based Representation for Gesture Recognition*, Gesture-Based Communication in Human-Computer Interaction: [Lecture Notes in Computer Science; Lecture Notes in Artificial Intelligence; LNCS] (Feb. 6, 2004) 152-163.
Oka, K. et al., *Real-Time Fingertip Tracking and Gesture Recognition*, Computer Graphics and Applications, IEEE (Nov./Dec. 2002) 64-71.
Park, J. et al., *Efficient Fingertip Tracking and Mouse Pointer Control for a Human Mouse*, Proceedings of the 3rd International Conference on Computer Vision Systems (2003) 88-97.
Shin, J. et al., *Hand Region Extraction and Gesture Recognition Using Entropy Analysis*, International Journal of Computer Science and Network Security, vol. 6, No. 2A (Feb. 2006) 216-222.
Tan, W. et al., *Hand Extraction Using Geometric Moments Based on Active Skin Color Model*, IEEE International Conference on Intelligent Computing and Intelligent Systems (2009) 468-471.
Wong, A. L. N. et al., *Hand Geometry Image Enhancement and Feature Extraction*, http://cwww.ee.nctu.edu.tw/_cfund/docs/papers/2002/wong_icip2002.pdf (Oct. 27, 2009).

* cited by examiner

US 9,251,409 B2

METHODS AND APPARATUSES FOR GESTURE RECOGNITION

RELATED APPLICATION

This application was originally filed as PCT Application No. PCT/CN2011/080962 filed Oct. 18, 2011.

TECHNOLOGICAL FIELD

Embodiments of the present invention relate generally to gesture recognition technology and, more particularly, relate to a method, apparatus, and computer program product for facilitating gesture recognition using a mobile visual system, such as a mobile terminal.

BACKGROUND

As the capabilities and processing power of mobile terminals continues to grow, mobile terminals are increasingly used for a multitude of services previously reserved for larger and less mobile devices. One such service may include gesture recognition based on a captured image and/or video. However due to complex imaging conditions and high integration of cameras in mobile terminals, challenges exist in timely processing data and ultimately finger segmentation and tracking. For example, a fingertip is a small and in a generally shadowed target region with low image contrast and additionally there exists the possibility for excessive image noise. Further a mobile terminal's form factor may not be configured with a high powered infrared light emitting diode and a high powered camera.

BRIEF SUMMARY

Methods, apparatuses, and computer program products are herein provided for enabling hand gesture recognition using an example infrared (IR) enabled mobile terminal. Such methods, apparatuses, and computer program products as are described herein are further configured to determine hand regions and fingertip location to enable gesture based interaction with a projected image. In some embodiments, a perimeter determination may be automatically determined based on various imaging conditions.

One example method may include determining a hand region in at least one captured frame using an adaptive omnidirectional edge operator (AOEO). The method may further include determining a threshold for hand region extraction using a recursive binarization scheme. The method may also include determining a hand location using the determined threshold for the extracted hand region in the at least one captured frame. The method may also include determining a fingertip location based on the determined hand location.

An example apparatus may include at least one processor and at least one memory storing computer program code, wherein the at least one memory and stored computer program code are configured, with the at least one processor, to cause the apparatus to at least determine a hand region in at least one captured frame using an AOEO. The at least one memory and stored computer program code are further configured, with the at least one processor, to cause the apparatus to determine a threshold for hand region extraction using a recursive binarization scheme. The at least one memory and stored computer program code are further configured, with the at least one processor, to cause the apparatus to determine a hand location using the determined threshold for the extracted hand region in the at least one captured frame. The at least one memory and stored computer program code are further configured, with the at least one processor, to cause the apparatus to determine a fingertip location based on the determined hand location.

In a further embodiment, a computer program product is provided that includes at least one non-transitory computer-readable storage medium having computer-readable program instructions stored therein, the computer-readable program instructions includes program instructions configured to determine a hand region in at least one captured frame using an AOEO. The computer-readable program instructions also include program instructions configured to determine a threshold for hand region extraction using a recursive binarization scheme. The computer-readable program instructions also include program instructions configured to determine a hand location using the determined threshold for the extracted hand region in the at least one captured frame. The computer-readable program instructions also include program instructions configured to determine a fingertip location based on the determined hand location.

One example apparatus may include means for determining a hand region in at least one captured frame using an AOEO. The apparatus may further include means for determining a threshold for hand region extraction using a recursive binarization scheme. The apparatus may further include means for determining a hand location using the determined threshold for the extracted hand region in the at least one captured frame. The apparatus may further include means for determining a fingertip location based on the determined hand location.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
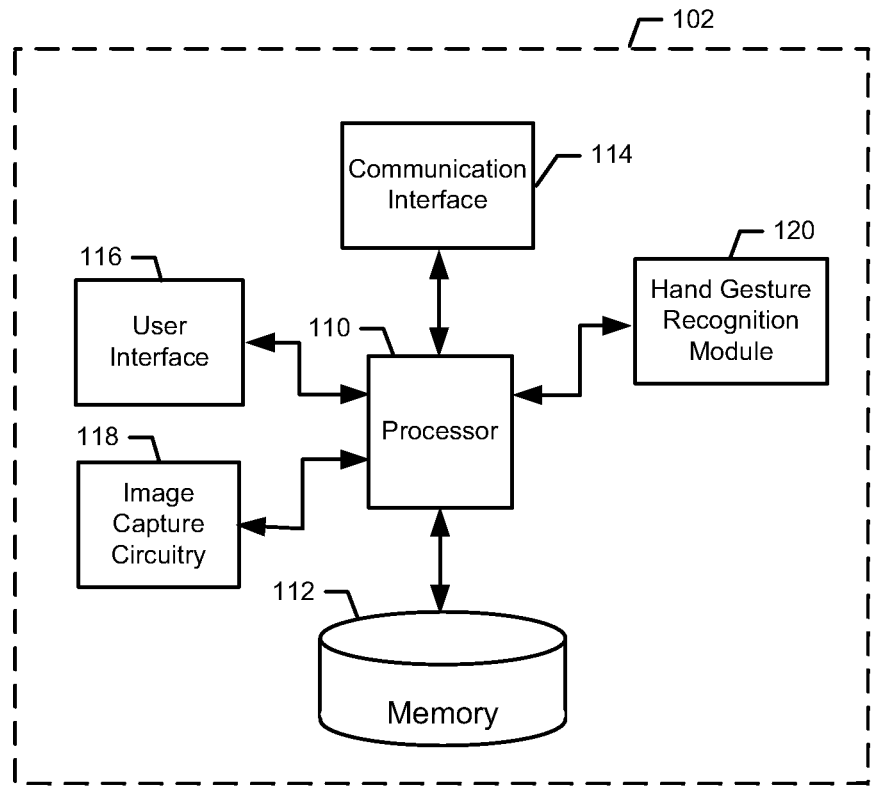
FIG. 1 illustrates an example block diagram of an example gesture recognition apparatus n according to an example embodiment of the present invention.

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

FIG. 1 illustrates a block diagram of a gesture recognition apparatus 102 for recognizing a gesture in an image or a series of images (e.g. media clip, video, video stream and/or the like) according to an example embodiment of the present invention. It will be appreciated that the gesture recognition apparatus 102 is provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for determining a gesture in an image or a series of images other configurations may also be used to implement embodiments of the present invention.

The gesture recognition apparatus 102 may be embodied as a desktop computer, laptop computer, mobile terminal, mobile computer, tablet, mobile phone, mobile communication device, one or more servers, one or more network nodes, game device, digital camera/camcorder, audio/video player, television device, radio receiver, digital video recorder, positioning device, any combination thereof, and/or the like. In an example embodiment, the gesture recognition apparatus 102 may be embodied as a mobile terminal, such as that illustrated in FIG. 2. Additionally, or alternatively the gesture recognition apparatus 102 may be embodied as a remote server, remote network node and/or the like remote from the mobile terminal, such as that illustrated in FIG. 3.

Figure 2:
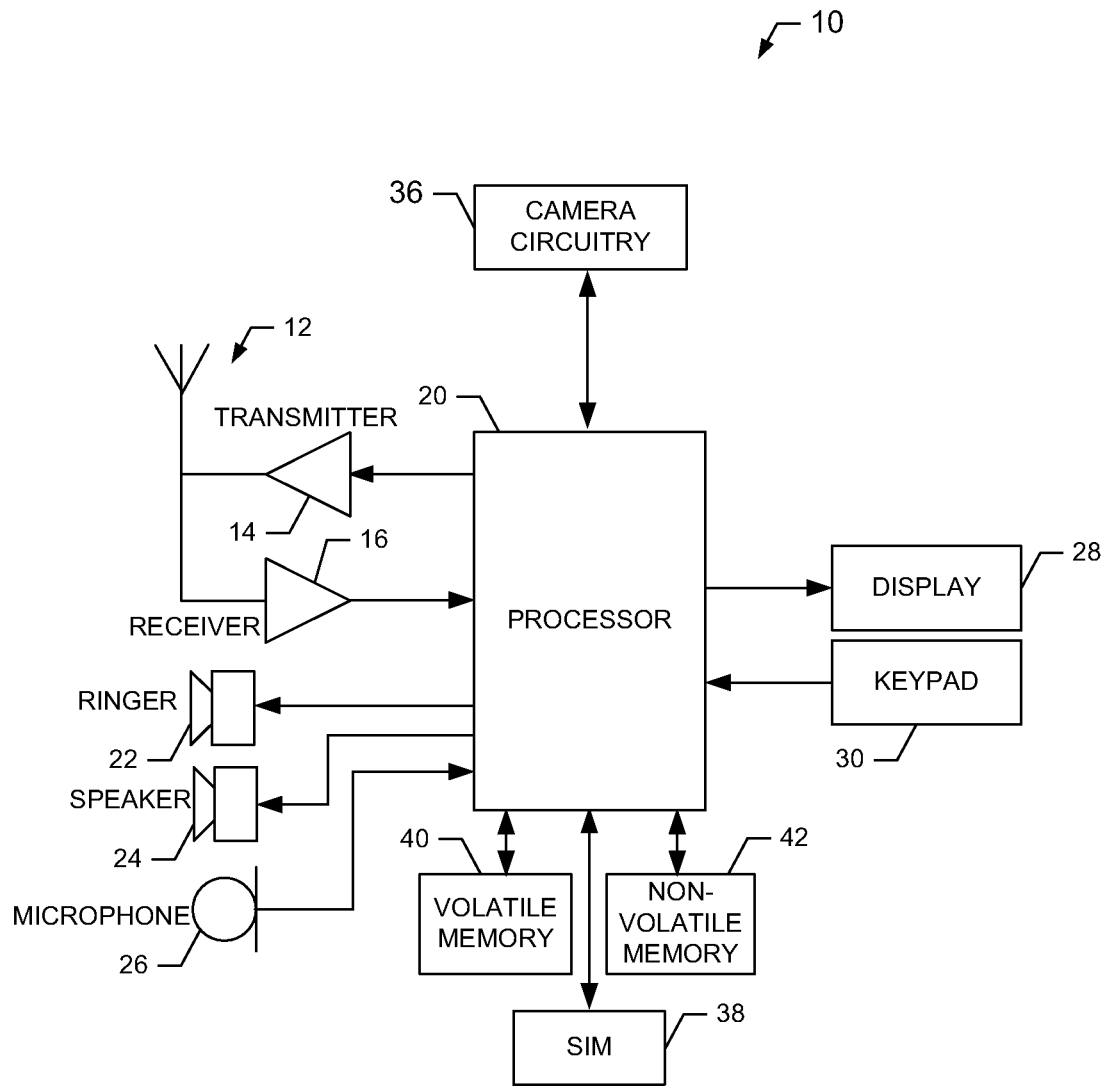
FIG. 2 is an example schematic block diagram of an example mobile terminal according to an example embodiment of the present invention.

In this regard, FIG. 2 illustrates a block diagram of a mobile terminal 10 representative of one embodiment of a gesture recognition apparatus 102. It should be understood, however, that the mobile terminal 10 illustrated and hereinafter described is merely illustrative of one type of gesture recognition apparatus 102 that may implement and/or benefit from embodiments of the present invention and, therefore, should not be taken to limit the scope of the present invention. While several embodiments of the mobile terminal (e.g., mobile terminal 10) are illustrated and will be hereinafter described for purposes of example, other types of mobile terminals, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal 10 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal 10 may be allocated between these devices according to their respective capabilities. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the interne or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

The mobile terminal 10 may include a media capturing element, such as a camera, video and/or audio module, in communication with the processor 20. The media capturing element may comprise any means for capturing an image, video and/or audio for gesture recognition, storage, display or transmission. For example, in an example embodiment in which the media capturing element comprises camera circuitry 36, the camera circuitry 36 may include a digital camera configured to form a digital image file from a captured image. In addition, the digital camera of the camera circuitry 36 may be configured to capture a video clip. As such, the camera circuitry 36 may include all hardware, such as a lens or other optical component(s), and software necessary for creating a digital image file from a captured image as well as a digital video file from a captured video clip. Alternatively, the camera circuitry 36 may include only the hardware needed to view an image, while a memory device of the mobile terminal 10 stores instructions for execution by the processor 20 in the form of software necessary to create a digital image file from a captured image. As yet another alternative, an object or objects within a field of view of the camera circuitry 36 may be displayed on the display 28 of the mobile terminal 10 to illustrate a view of an image currently displayed which may be captured if desired by the user. As such, a captured image may, for example, comprise an image captured by the camera circuitry 36 and stored in an image file. As another example, a captured image may comprise an object or objects currently displayed by a display or viewfinder of the mobile terminal 10, but not necessarily stored in an image file. In an example embodiment, the camera circuitry 36 may further include a processing element such as a co-processor configured to assist the processor 20 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include other non-transitory memory, such as volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the gesture recognition apparatus 102 includes various means for performing the various functions herein described. These means may comprise one or more of a processor 110, memory 112, communication interface 114, user interface 116, image capture circuitry 118, and/or hand gesture recognition module 120. The means of the gesture recognition apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the gesture recognition apparatus 102 as described herein. The plurality of processors may be embodied on a single computing device or distributed across a plurality of computing devices collectively configured to function as the gesture recognition apparatus 102. In embodiments wherein the gesture recognition apparatus 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the gesture recognition apparatus 102 to perform one or more of the functionalities as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, non-transitory memory, such as volatile memory, non-volatile memory, or some combination thereof. Although illustrated in FIG. 1 as a single memory, the memory 112 may comprise a plurality of memories. The plurality of memories may be embodied on a single computing device or may be distributed across a plurality of computing devices collectively configured to function as the gesture recognition apparatus 102. In various example embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the gesture recognition apparatus 102 is embodied as a mobile terminal 10, the memory 112 may comprise the volatile memory 40 and/or the non-volatile memory 42. The memory 112 may be configured to store information, data, applications, instructions, or the like for enabling the gesture recognition apparatus 102 to carry out various functions in accordance with various example embodiments. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. The stored information may include, for example, models used for gesture recognition, hand recognition, and/or the like. This stored information may be stored and/or used by the image capture circuitry 118 and/or hand gesture recognition module 120 during the course of performing their functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data to/from another computing device. For example, the communication interface 114 may be configured to receive data representing an image over a network. In this regard, in embodiments wherein the gesture recognition apparatus 102 comprises a server, network node, or the like, the communication interface 114 may be configured to communicate with a remote mobile terminal (e.g., the remote terminal 304) to allow the mobile terminal and/or a user thereof to access gesture recognition functionality provided by the gesture recognition apparatus 102. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the gesture recognition apparatus 102 and one or more computing devices are in communication. The communication interface 114 may additionally be in communication with the memory 112, user interface 116, image capture circuitry 118, and/or hand gesture recognition module 120, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the gesture recognition apparatus 102 is embodied as one or more servers, aspects of the user interface 116 may be reduced or the user interface 116 may even be eliminated. The user interface 116 may be in communication with the memory 112, communication interface 114, image capture circuitry 118, and/or hand gesture recognition module 120, such as via a bus.

The image capture circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the image capture circuitry 118 is embodied separately from the processor 110, the image capture circuitry 118 may be in communication with the processor 110. The image capture circuitry 118 may further be in communication with one or more of the memory 112, communication interface 114, user interface 116, and/or hand gesture recognition module 120, such as via a bus.

The image capture circuitry 118 may comprise hardware configured to capture an image. In this regard, the image capture circuitry 118 may comprise a camera lens, IR lens and/or other optical components for capturing a digital image. As another example, the image capture circuitry 118 may comprise circuitry, hardware, a computer program product, or some combination thereof that is configured to direct the capture of an image by a separate camera module embodied on or otherwise operatively connected to the gesture recognition apparatus 102. In embodiments wherein the gesture recognition apparatus 102 is embodied as a mobile terminal 10, the image capture circuitry 118 may comprise the camera circuitry 36. In embodiments wherein the gesture recognition apparatus 102 is embodied as one or more servers or other network nodes remote from a mobile terminal configured to provide an image or video to the gesture recognition apparatus 102 to enable the gesture recognition apparatus 102 to perform gesture recognition on the image or video, aspects of the image capture circuitry 118 may be reduced or the image capture circuitry 118 may even be eliminated.

The hand gesture recognition module 120 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the hand gesture recognition module 120 is embodied separately from the processor 110, the hand gesture recognition module 120 may be in communication with the processor 110. The hand gesture recognition module 120 may further be in communication with one or more of the memory 112, communication interface 114, user interface 116, and/or image capture circuitry 118, such as via a bus.

The hand gesture recognition module 120 may be configured to provide location information for fingertips in an image, a series of images, a frame of a video, a media content event and/or the like. Various gestures may be determined based on various trajectories of a hand region or fingertip movements and based on various semantics. In particular, and as shown with reference to FIG. 4, a camera, image capture circuitry 118 may be located in a stable position so as to enable foreground and background (e.g. part of the image that depicts scenery to the rear or behind the main subject) extraction of a captured image and/or captured series of images. Further, the background image consistency may lead to the ability to extract those items in the foreground. Such foreground extraction may enable the hand gesture recognition module 10 to determine a possible hand region and fingertip location.

Figure 4:
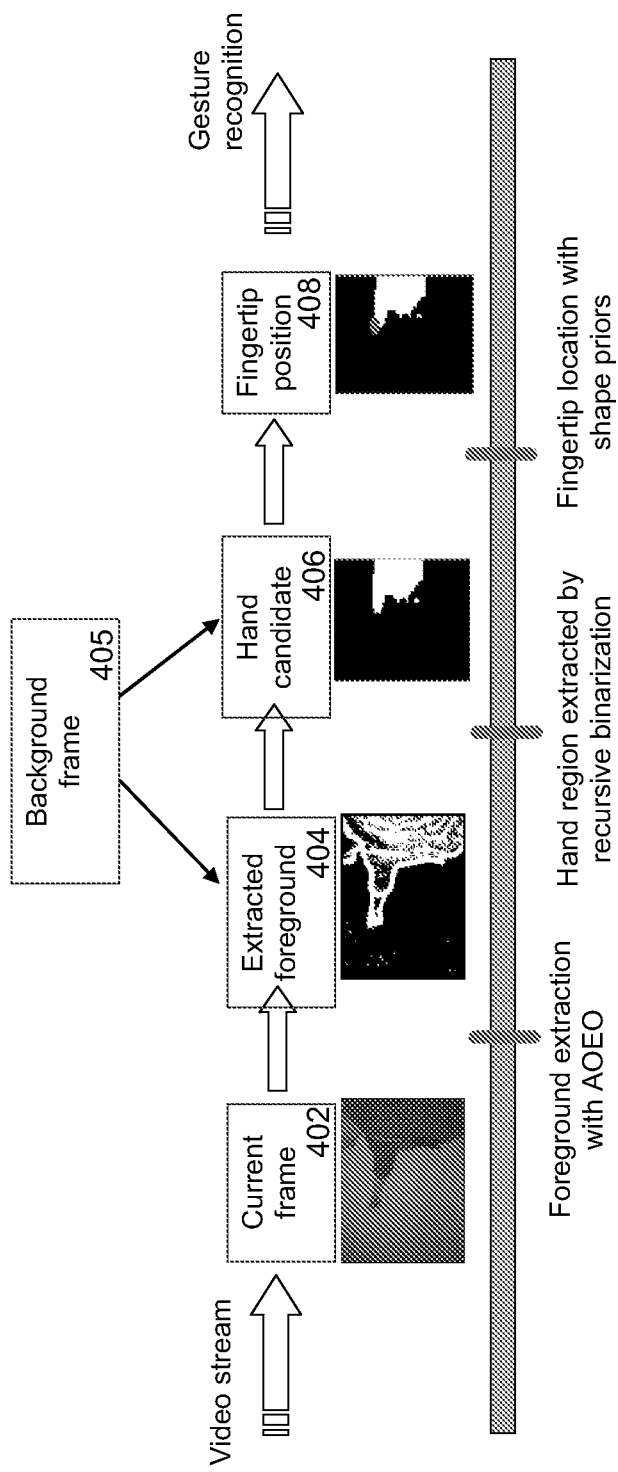
FIG. 4 illustrates a flowchart according to an example method for gesture recognition according to an example embodiment of the invention.

Referring now to FIG. 4, the processor 110, the hand gesture recognition module 120 or the like of FIG. 1 may be configured to receive a video stream, for example from the image capture circuitry 118. The hand gesture recognition module 120, may then capture a current frame. See operation 402. In an embodiment, a background is determined. See operation 405. The foreground may then be extracted using adaptive omnidirectional edge operator (AOEO). See operation 404. A hand candidate 506 may be then determined by the hand gesture recognition module based on the extracted foreground using, for example recursive binarization. See operation 406. A fingertip position may be located based on the determined hand candidate, for example by using shape priors as described herein. See operation 408.

Referring again to FIG. 1, in an embodiment, the hand gesture recognition module 120 is configured to perform foreground extraction with AOEO. In some embodiments, both intensity and edge are two low level image features that may be used in foreground extraction, however other image features may be used in alternate embodiments. In some example embodiments, because edges are at times more stable against random noises and lighting variations, an edge operation of AOEO may be used to determine fast edge map computation and adaptive thresholding.

Figure 5A:
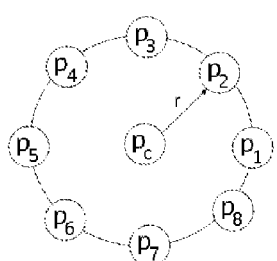
FIGS. 5a-5e, 6a-6b, 7 illustrate example embodiments of an example gesture recognition system according to an example embodiment of the invention.

In an embodiment, the hand gesture recognition module 120 may be configured to determine an omnidirectional edge operation. In order to perform fast calculations using, for example, the processor 110, with minimal directional edge information loss, an omni-direction edge operator, such the edge operator AOEO that is referenced in FIG. 5a is used. An edge magnitude e of a pixel may be computed as:

$$e = \sum_{i=1}^{8} \text{abs}(p_c - p_n)$$

Where, for example, $p_c$ is the intensity of the pixel and $p_n$ is the intensity of one surrounding pixel. Using an edge operator e directional information may be jointly considered during the generation of an edge map. Alternatively or additionally an absolute value operation may further fasten a computation and may be advantageous in some embodiments.

Figure 5B:
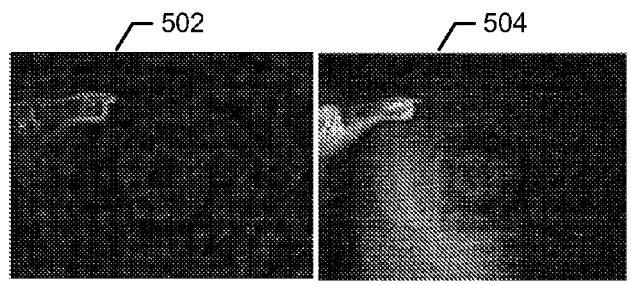

The example hand gesture recognition module 120 may then be configured to perform image differencing. Image differencing is performed, in some example embodiments, between a current frame and a determined background. In some embodiments a background may be captured prior to gesture recognition, however in some example embodiments, a background may also be determined based on a series of images with similar features. Once a background is determined a current frame and the determined background may then be applied to obtain, such as by the processor 110, the hand gesture recognition module 102 or the like, an image differencing based on both images being filtered by an edge operator E. Edge maps of the background and the current frame may be denoted as $E_c$ and $E_b$. For example, FIG. 5b illustrates different image differencing strategies 502 and 504 based on edge maps and/or image intensities. An example differencing equation may be represented as:

$$D = \text{abs}(E_c - E_b)$$

Figure 5C:
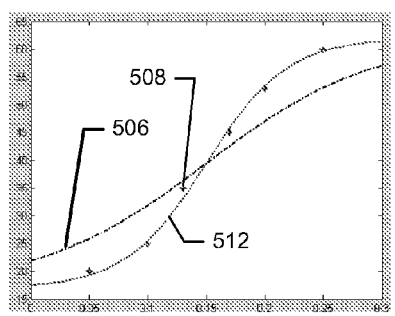

After image differencing, the example hand gesture recognition module 120 may be configured to determining an output binarization using parameter learning. In an embodiment, binarization and a parameter may be determined based on a learned thresholds equation, an example of which is illustrated as a contrast-threshold curve in FIG. 5c:

$$F = \begin{cases} 1, & D > th(contr) \\ 0, & D \leq th(contr) \end{cases}$$

$$th(contr) = \frac{a}{1 + \exp(-c*(contr - \delta))} + k$$

Where th(contr) is a learned threshold and contr is an image contrast of the current frame. In an embodiment, th(contr) may be a sigmoid function and a, c, δ and k are constants. In this example α=45, c=29, δ=0.15 and k=17. In an embodiment, the learned threshold may be determined using a determined image contrast. As described herein, FIG. 5c illustrates a contrast-threshold curve with the horizontal axis denoting image contrasts, while the vertical axis denotes thresholds determined in the learned thresholds equation. Based on the optimal thresholds, binarization results are of the images shown FIG. 4b are shown in FIG. 4d.

Figure 5D:
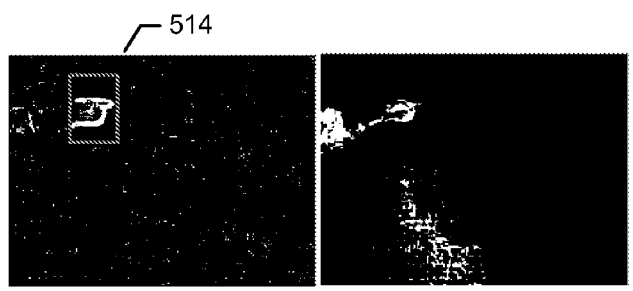
Figure 5E:

In an embodiment, a sigmoid function may enable smooth output adaptation and flexibility of fitting non-linear data. As shown in the learned threshold equation above, there are four parameters to be determined. In an embodiment, the example hand gesture recognition module 120 may be configured to determine, for different image contrasts, a best binarization threshold that may be obtained from the determined threshold-contrast points, as displayed for example in FIG. 5c. The parameters of the learned thresholds equation may also be determined based on minimum squared error (e.g. fitting points within sigmoid functions). FIG. 5c further illustrates points 508 to be fitted within the learned curve 512. For example, if c=14 and other parameters are kept invariant, the threshold-contrast curve is drawn as the black dotted curve 506 in FIG. 5c and its binarization result on differencing image is shown in FIG. 5e.

In an embodiment, after foreground extraction, a position of a hand region may be coarsely estimated. For example, the position of the hand region may be estimated based on a direction a hand enters the viewfinder of a camera, and then a hand region candidate may be determined along the direction of entry. Such a possible hand region 514 may then be labeled by the hand gesture recognition module 120, such as the marking illustrated in FIG. 5d.

In some example embodiments, the hand gesture recognition module 120 may be configured to perform recursive binarization for hand extraction. As described herein, course hand position may also be determined based on the AOEO. However, recursive binarization may also be used to perform image morphological like operations in order to determine a clear hand region. Alternatively or additionally, the learning based initial threshold may be used.

Figure 6A:
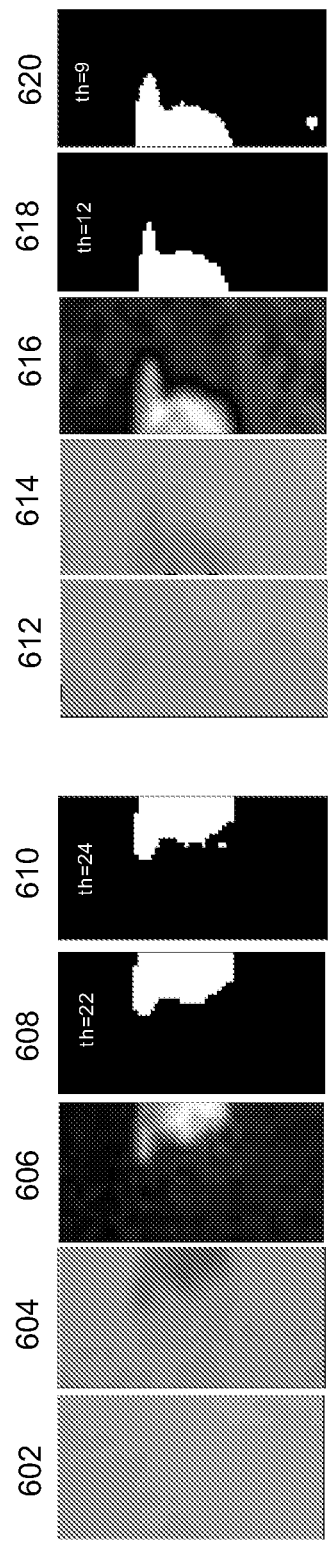

Alternatively or additionally, image patches may be intercepted from the background and the current frames in an area around a potential hand position. Then, a differencing operation may be performed on the image patches, once such differencing operation includes:

$$D=abs(G(I_1)-G(I_n))$$

Where $G(I_1)$ is the smoothed background patch with Gaussian function is shown in 602 and 612 of FIG. 6a, $G(I_n)$ and an example smoothed version is shown in 604 and 614 of FIG. 6a, and D represents their difference as is shown in 606 and 616 of FIG. 6a.

Figure 6B:
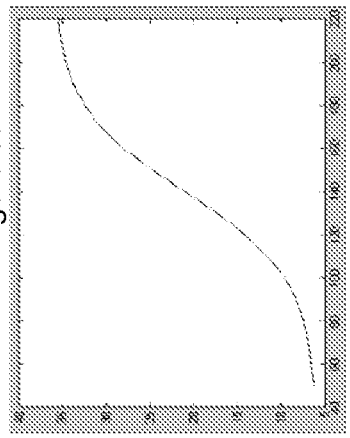

Followed by the learning strategy, an initialing thresholding of D may be adaptively learned from the received images, such as those images received by the camera circuitry 118. In an embodiment, the threshold of D may be related to image brightness and such a relationship may be modeled as a sigmoid function. For example a threshold-brightness equation may be expressed as:

$$F = \begin{cases} 1, & D > th(\text{bright}) \\ 0, & D \leq th(\text{bright}) \end{cases}$$

$$th(\text{bright}) = \frac{a}{1 + \exp(-c^*(\text{bright}-\delta))} + k$$

Where th(bright) is the learned threshold and bright the image brightness, and here may be represented as $\alpha=40$, $c=0.05$, $\delta=140$, $k=20$. These parameters may be learned to best fit discrete threshold-brightness points. An example threshold-brightness curve is illustrated in FIG. 6b and it horizontal axis denotes image brightness, while its vertical axis denotes thresholds as determined by the threshold-brightness equation. For example, the threshold may be determined by the brightness of the image, because, for example in some images image intensity variations caused by foreground changes are more obvious in instances in which a background is brighter. The binarization results of two example cases are shown in 608 and 618 of FIG. 6a.

The example hand gesture recognition module 120 may be configured to provide repeating probing for foreground refinement. Though initial thresholding may, in some example embodiments, obtain relatively good binarization results, more optimal threshold and additional thresholding may be advantageous in some example embodiments. An example refinement probing scheme may include but is not limited to:

Initialize a threshold, such as threshold th=th(bright)−5;
Define a target ratio $r_0$;
Extract a foreground F with $$F = \begin{cases} 1, & D > th \\ 0, & D \leq th \end{cases},$$

where D is determined by the threshold brightness equation as described herein;

Compute, using a processor, such as processor 110, a current ratio r, which in some example embodiments may be a ratio of the foreground area to that of the background patch;

In an instance in which $r \leq r_0$, the refinement process may be finished in some example embodiments, otherwise the threshold is incremented and the probing scheme may be repeated.

Outcomes of an example refinement probing scheme are illustrated with respect to 610 and 620 of FIG. 6a.

The example hand gesture recognition module 120 may further be configured to determine shape invariants for hand verification. Shape moments, such as a Hu moment, may keep rotation, scaling and translation invariant against shape variations. In an embodiment, Hu moment modules of hand shapes may be pre learned and stored in the memory, such as memory 112. Then the stored Hu moments of the hand region candidates and the Hu moment modules may be compared and in an instance in which they are not similar then a current hand region candidate may be a false alarm and then discarded.

Figure 7:
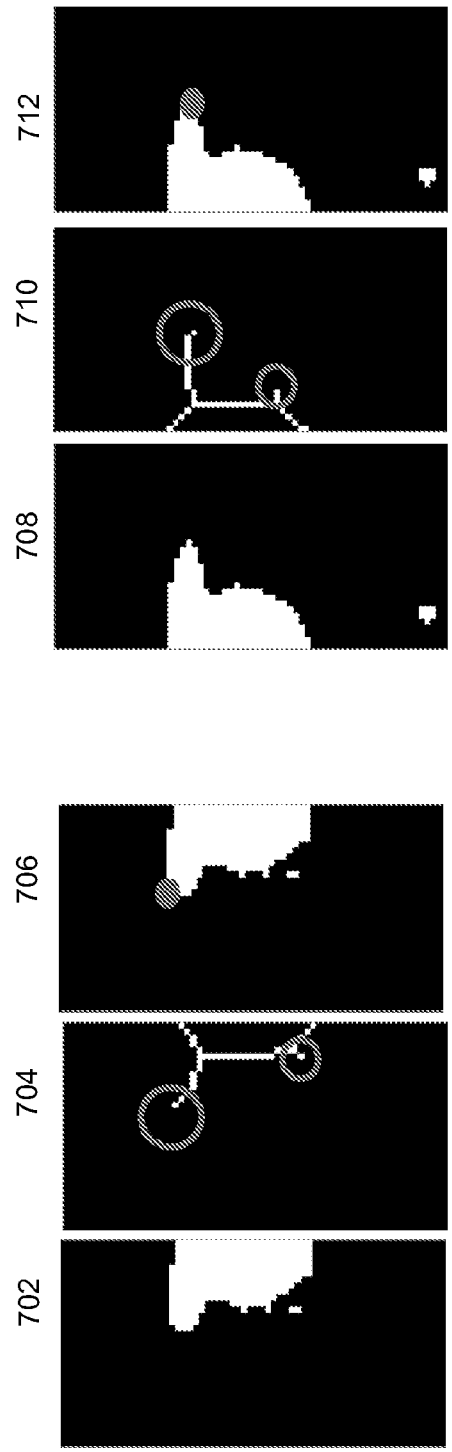

The example hand gesture recognition module 120 may further be configured to perform image skeletonization to determine a fingertip location. Based on the observation that a fingertip is located at the end of the hand, fingertip candidates may be found as shown in 704 and 710 of FIG. 7 and labeled by red circles. Some noise may result in wrong candidates, but usually fingertips should be the furthest away from the image border. With these candidates, the fingertips are precisely located as shown in the 706 and 712 columns of FIG. 7.

Figure 3:
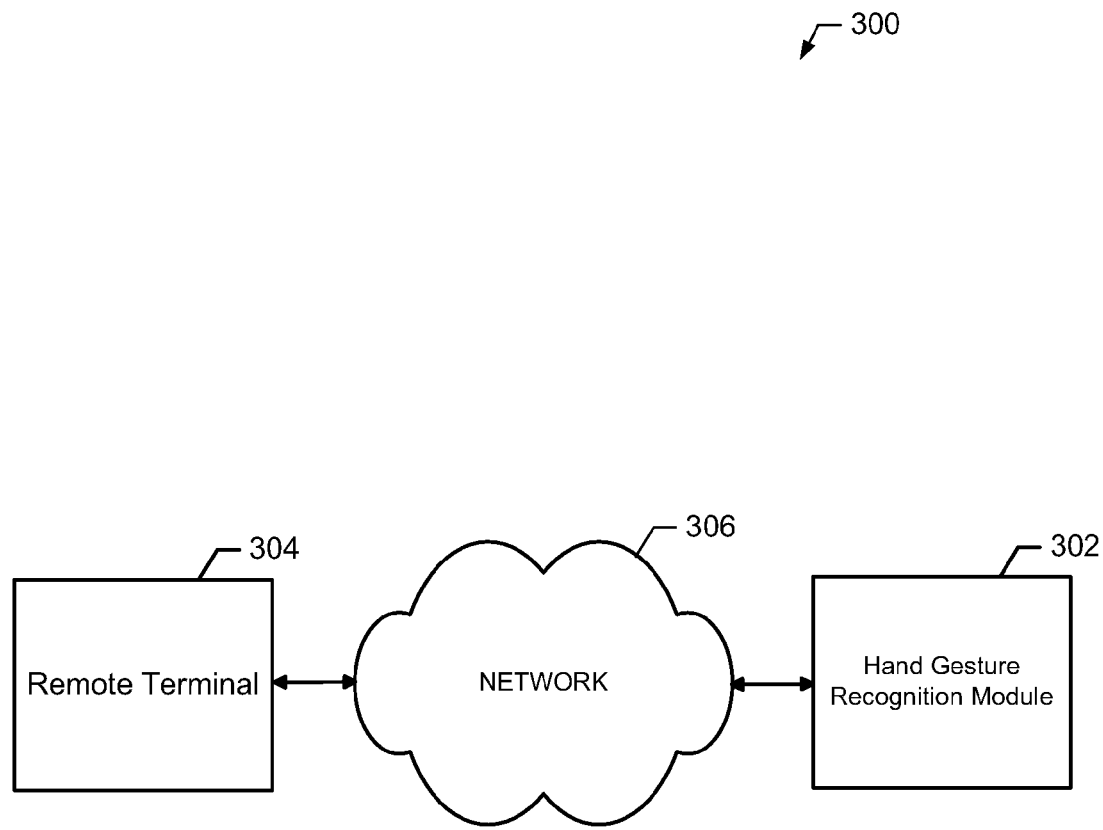
FIG. 3 illustrates a system for performing example gesture recognition according to an example embodiment of the invention.

As described in conjunction with the embodiment of FIG. 1, the mobile terminal may include the gesture recognition apparatus 102. However, the gesture recognition apparatus 102 may also be separated from and in communication with the mobile terminal. Further, FIG. 3 illustrates a system 300 for performing message recipient authentication according to an example embodiment of the invention. The system 300 comprises a gesture recognition apparatus 302 and a remote terminal 304 configured to communicate over the network 306. The gesture recognition apparatus 302 may, for example, comprise an embodiment of the gesture recognition apparatus 102 wherein the gesture recognition apparatus 102 is embodied as one or more servers, one or more network nodes, a cloud computing system and/or the like that is configured to provide recipient based message authentication services to a remote mobile terminal and/or user thereof. The remote terminal 304 may comprise any mobile terminal configured to access the network 306 and communicate with the gesture recognition apparatus 302 in order to access message recipient authentication that is provided by the gesture recognition apparatus 302. The remote terminal 304 may, for example, be embodied as a desktop computer, laptop computer, mobile terminal, mobile computer, mobile phone, mobile communication device, mobile terminal 10, game device, digital camera/camcorder, audio/video player, television device, radio receiver, digital video recorder, positioning device, any combination thereof, and/or the like. The network 306 may comprise a wireline network, wireless network (e.g., a cellular network, wireless local area network, wireless wide area network, some combination thereof, or the like), a direct communication link (e.g., Bluetooth, machine-to-machine communication or the like) or a combination thereof, and in one embodiment comprises the interne.

In the example system illustrated in FIG. 3, the gesture recognition apparatus 302 may be configured to receive an image, video clip, video frame, and/or the like sent by the remote terminal 304. The gesture recognition apparatus 302 (e.g., gesture recognition module 120) may be configured to determine a gesture within the received image, video clip, and/or video frame in accordance with any of the embodiments described herein below with respect to the gesture recognition apparatus 102. Gesture recognition apparatus 302 (e.g., gesture recognition apparatus 120 and/or communication interface 114) may be further configured to transmit message gesture recognition results performed by the gesture recognition apparatus 302 to the remote terminal 304.

In another example embodiment of the system 300, aspects of the gesture recognition apparatus 120 may be distributed between the remote terminal 304 and gesture recognition apparatus 302. In this example embodiment, the gesture recognition apparatus 302 may handle some of the processing tasks required for gesture recognition. In this regard, the remote terminal 304 may not be required to perform more computationally-intensive steps for performing gesture recognition. In yet another example embodiment of the system 300, the remote terminal 304 and the gesture recognition apparatus 302 may be embodied by a single device such as is described with respect to FIGS. 1 and 2.

Figure 8:
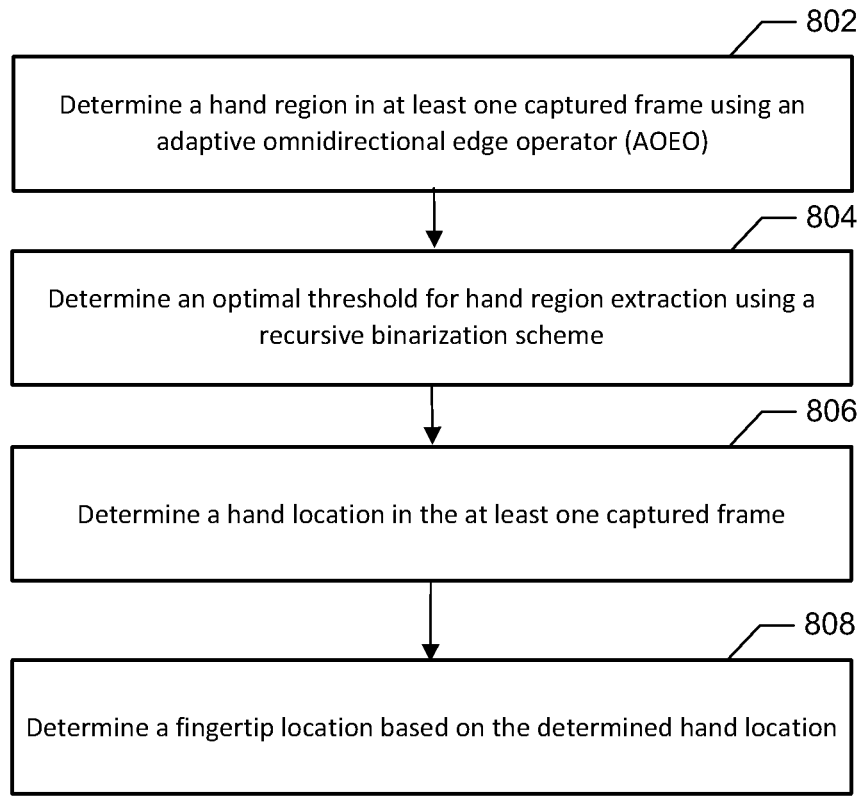
FIG. 8 illustrates a flowchart according to an example method gesture recognition system according to an example embodiment of the invention.

FIG. 8 illustrate an example flowchart of the example operations performed by a method, apparatus and computer program product in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 112 of an apparatus employing an embodiment of the present invention and executed by a processor 110 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 8, when executed, convert a computer or processing circuitry into a particular machine configured to perform an example embodiment of the present invention. Accordingly, the operations of FIG. 8 define an algorithm for configuring a computer or processing to perform an example embodiment. In some cases, a general purpose computer may be provided with an instance of the processor which performs the algorithms of FIG. 8 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 8 illustrates a flowchart according to an example method for performing gesture recognition according to an example embodiment of the invention. As shown in operation 802, the apparatus 102 may include means, such as the processor 110, the gesture recognition module 120, or the like, for determining a hand region in at least one capture frame using an AOEO. In some embodiments, the processor 110, the gesture recognition module 120, or the like may further be configured to determine an omnidirectional edge operator, determine an image differencing between the at least one captured frame and a background and determine a threshold for output binarization using perimeter learning. The determined threshold for output binarization may be based on a contrast of the least one capture frame.

As shown in operation 804, the apparatus 102 may include means, such as the processor 110, the gesture recognition module 120, or the like, for determining a threshold, such as an optimal threshold, for hand region extraction using a recursive binarization scheme. The threshold for hand region extraction may be determined based on an image brightness of the at least one captured frame. In some embodiments, the processor 110, the gesture recognition module 120, or the like may further be configured to determine a target ratio, extract a foreground from the at least one capture frame, and determine a current ratio by comparing the extracted foreground with a background of the at least one captured frame.

As shown in operation 806, the apparatus 102 may include means, such as the processor 110, the gesture recognition module 120, or the like, for determining a hand location in the at least one captured frame. As shown in operation 808, the apparatus 102 may include means, such as the processor 110, the gesture recognition module 120, or the like, for determining a fingertip location based on the determined hand location.

Advantageously, example gesture recognition systems as described herein may be executed on a mobile terminal, thus allowing hand gestures to be recognized as a rate, for example, of 40 ms for a frame.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining a hand region in at least one captured frame using an adaptive omnidirectional edge operator (AOEO), wherein determining the hand region comprises:
      determining an omnidirectional edge operator;
      determining an image differencing between the at least one captured frame and a background; and
      determining an adaptive threshold for output binarization using perimeter learning;
   determining a threshold for hand region extraction using a recursive binarization scheme;
   determining a hand location using the determined threshold for the extracted hand region in the at least one captured frame; and
   determining a fingertip location based on the determined hand location.

2. A method of claim 1 wherein determining the threshold for output binarization is based on a contrast of the at least one captured frame.

3. A method of claim 1 wherein determining the threshold for hand region extraction further comprises determining an initial threshold based on an image brightness.

4. A method of claim 1 wherein determining the hand location further comprises causing a hand to be verified in the at least one captured frame based on shape invariants.

5. A method of claim 1 wherein determining the fingertip location further comprises causing a skeletonization of the captured at least frame.

6. An apparatus comprising:
   a processor and
   a memory including software, the memory and the software configured to, with the processor, cause the apparatus to at least:
      determine a hand region in at least one captured frame using an adaptive omnidirectional edge operator (AOEO) by:
         determining an omnidirectional edge operator;
         determining an image differencing between the at least one captured frame and a background; and
         determining an adaptive threshold for output binarization using perimeter learning;
      determine a threshold for hand region extraction using a recursive binarization scheme;
      determine a hand location using the determined threshold for the extracted hand region in the at least one captured frame; and
      determine a fingertip location based on the determined hand location.

7. An apparatus of claim 6 wherein the at least one memory including the computer program code is further configured to, with the at least one processor, cause the apparatus to determine the threshold for output binarization based on a contrast of the at least one captured frame.

8. An apparatus of claim 6 wherein the at least one memory including the computer program code is further configured to, with the at least one processor, cause the apparatus to determine an initial threshold based on an image brightness.

9. An apparatus of claim 6 wherein the at least one memory including the computer program code is further configured to, with the at least one processor, cause the apparatus to cause a hand to be verified in the at least one captured frame based on shape invariants.

10. An apparatus of claim 6 wherein the at least one memory including the computer program code is further configured to, with the at least one processor, cause the apparatus to cause a skeletonization of the captured at least frame.

11. A computer program product comprising:
    at least one computer readable non-transitory memory medium having program code stored thereon, the program code which when executed by an apparatus cause the apparatus at least to perform the method of claim 1.

12. A method comprising:
    determining a hand region in at least one captured frame using an adaptive omnidirectional edge operator (AOEO);
    determining a threshold for hand region extraction using a recursive binarization scheme, wherein determining a threshold for hand region extraction comprises:
       determining a target ratio;
       extracting a foreground from the at least one captured frame; and
       determining a current ratio by comparing the extracted foreground with a background of the at least one captured frame;
    adjusting a threshold based on the comparison between the target ratio and the current ratio;
    determining a hand location using the determined threshold for the extracted hand region in the at least one captured frame; and
    determining a fingertip location based on the determined hand location.

13. A method of claim 12 wherein determining the hand location further comprises causing a hand to be verified in the at least one captured frame based on shape invariants.

14. A method of claim 12 wherein determining the fingertip location further comprises causing a skeletonization of the captured at least frame.

15. An apparatus comprising:
    a processor and
    a memory including software, the memory and the software configured to, with the processor, cause the apparatus to at least:

determine a hand region in at least one captured frame using an adaptive omnidirectional edge operator (AOEO);
determine a threshold for hand region extraction using a recursive binarization scheme by:
  determining a target ratio;
  extracting a foreground from the at least one captured frame; and
  determining a current ratio by comparing the extracted foreground with a background of the at least one captured frame;
adjust a threshold based on the comparison between the target ratio and the current ratio;
determine a hand location using the determined threshold for the extracted hand region in the at least one captured frame; and
determine a fingertip location based on the determined hand location.

16. An apparatus of claim 15 wherein the at least one memory including the computer program code is further configured to, with the at least one processor, cause the apparatus to cause a hand to be verified in the at least one captured frame based on shape invariants.

17. An apparatus of claim 15 wherein the at least one memory including the computer program code is further configured to, with the at least one processor, cause the apparatus to cause a skeletonization of the captured at least frame.

18. A computer program product comprising:
  at least one computer readable non-transitory memory medium having program code stored thereon, the program code which when executed by an apparatus cause the apparatus at least to perform the method of claim 12.

19. A computer program product of claim 18 wherein determining the threshold for output binarization is based on a contrast of the at least one captured frame.

20. A computer program product of claim 18, further comprising program code instructions to determine an initial threshold based on an image brightness.

* * * * *